R. B. DOW.
COMBINED SHAPING AND MILLING MACHINERY.
APPLICATION FILED DEC. 29, 1913.
1,221,844.
Patented Apr. 10, 1917.
7 SHEETS—SHEET 4.
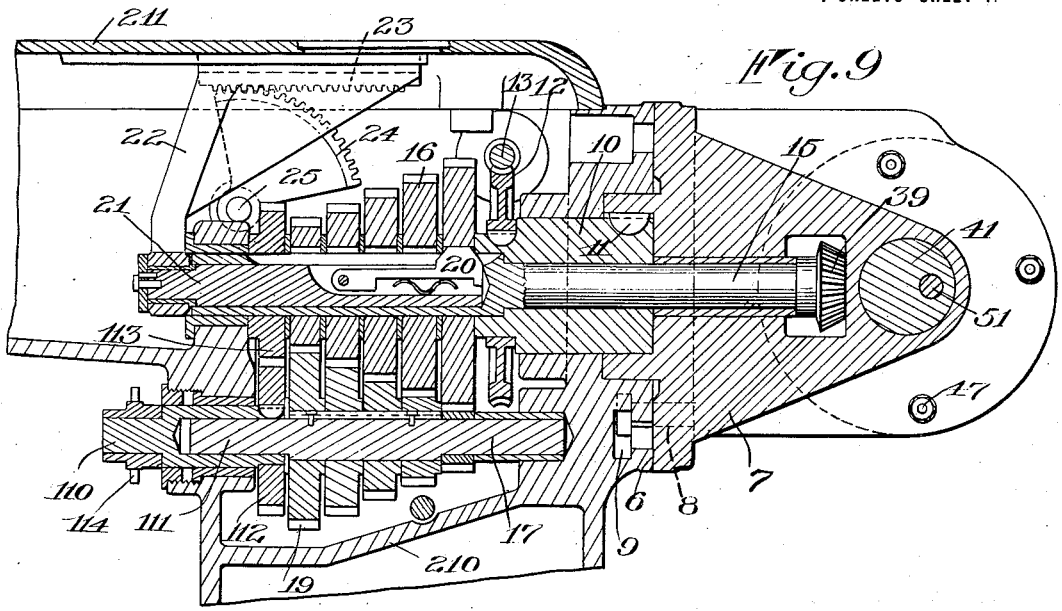
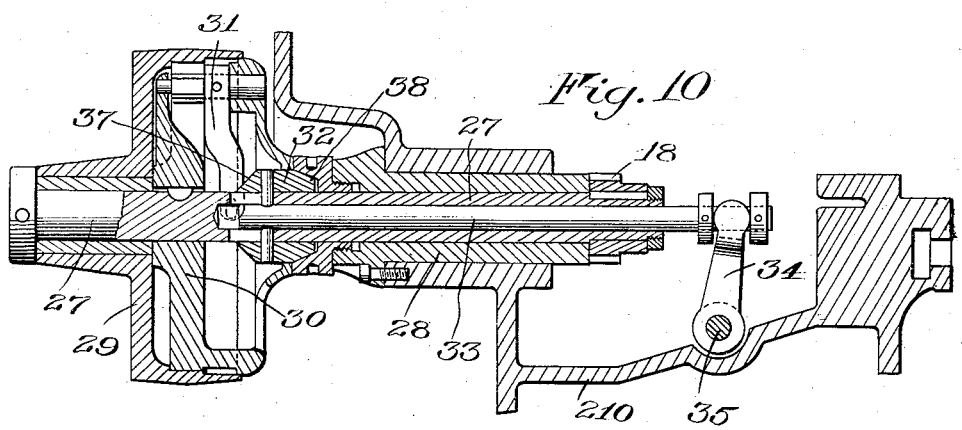
Inventor
Roy B. Dow
Witnesses
Walter B. Payne
Clyde L. Rogers
By Church & Rich
his Attorneys

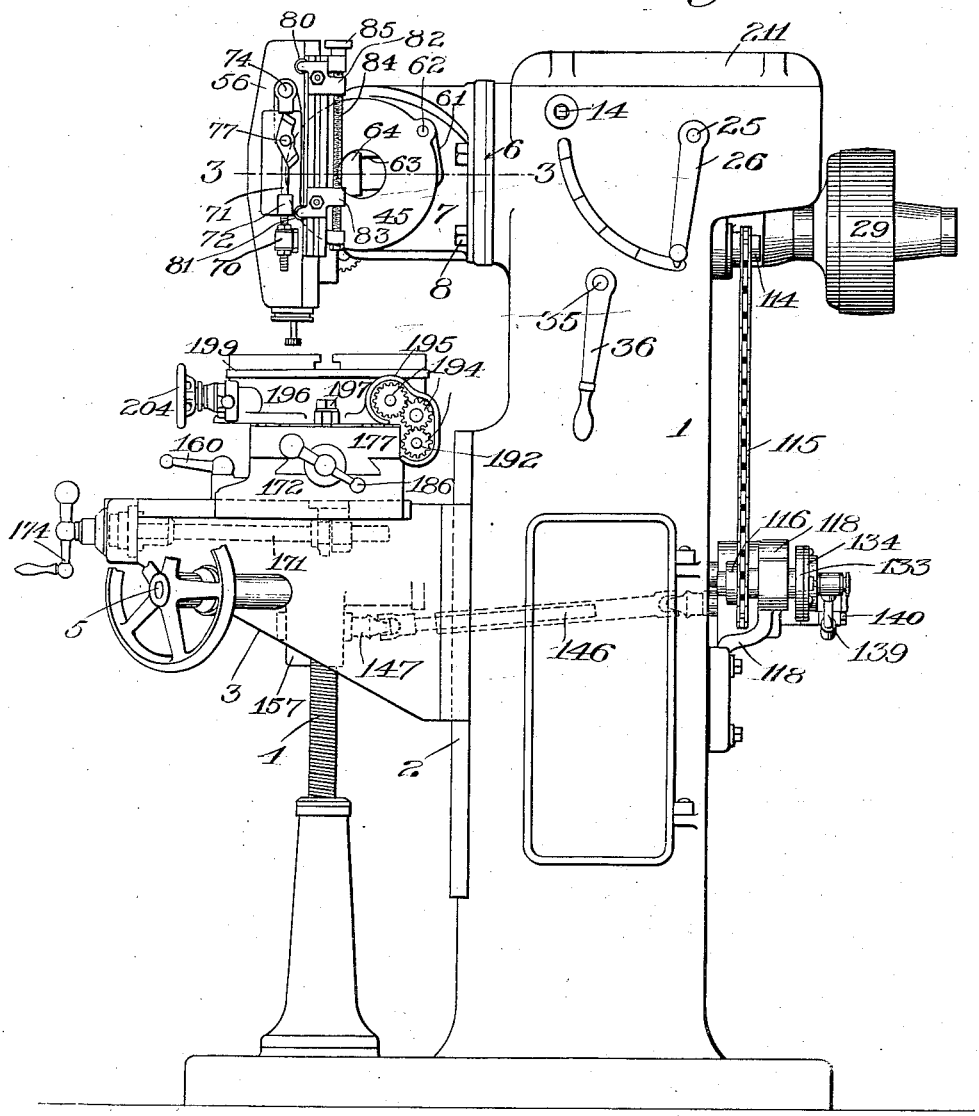

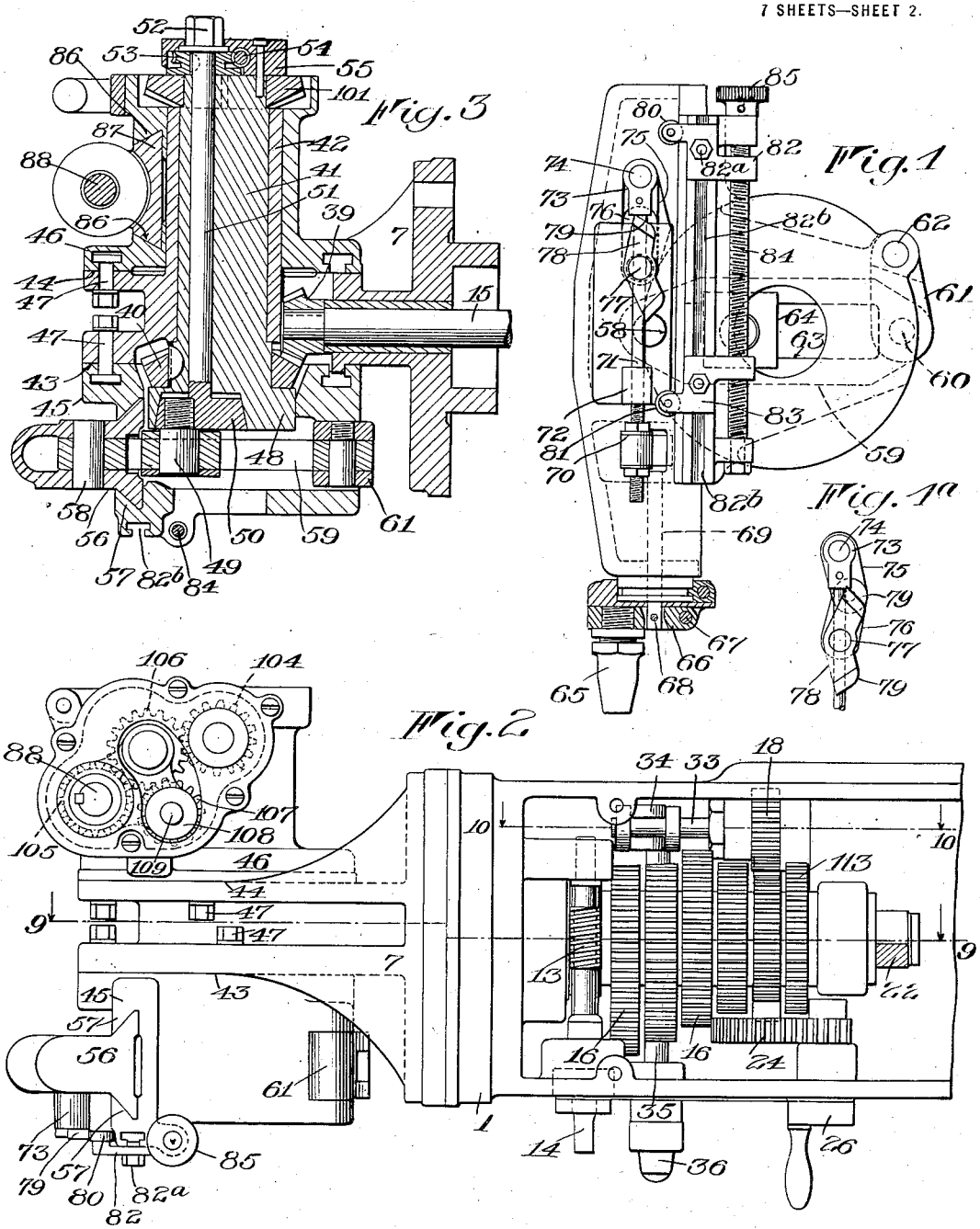

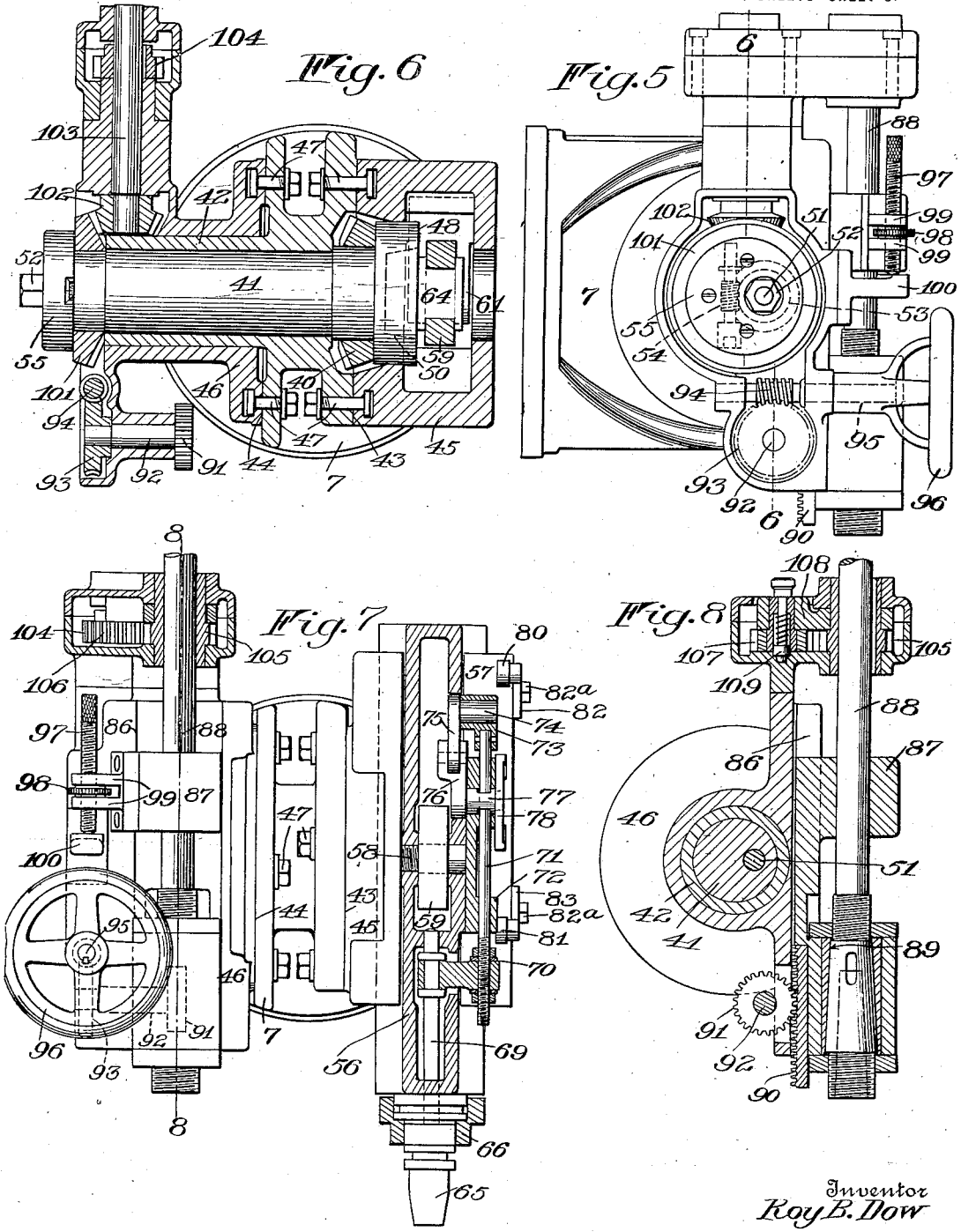

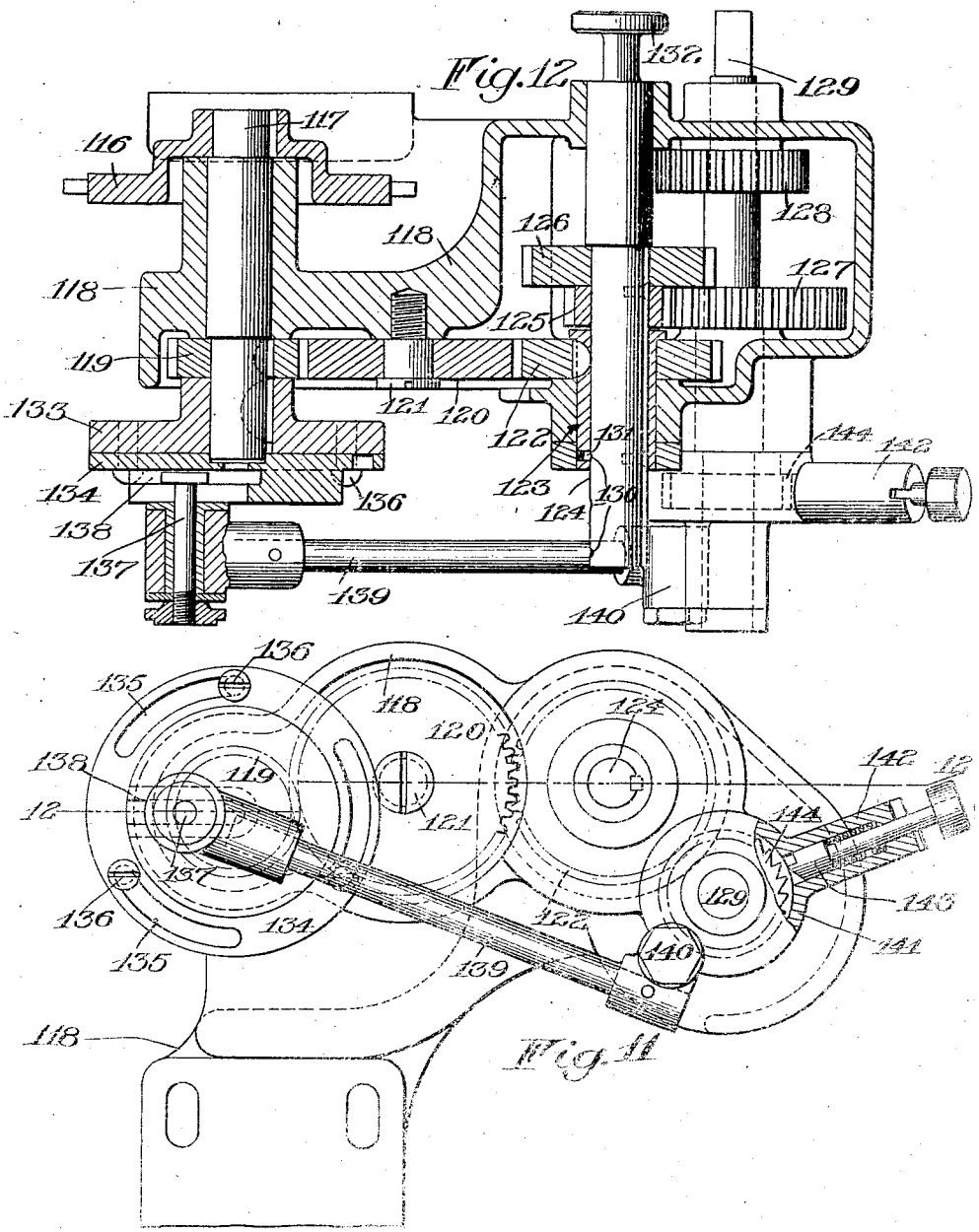

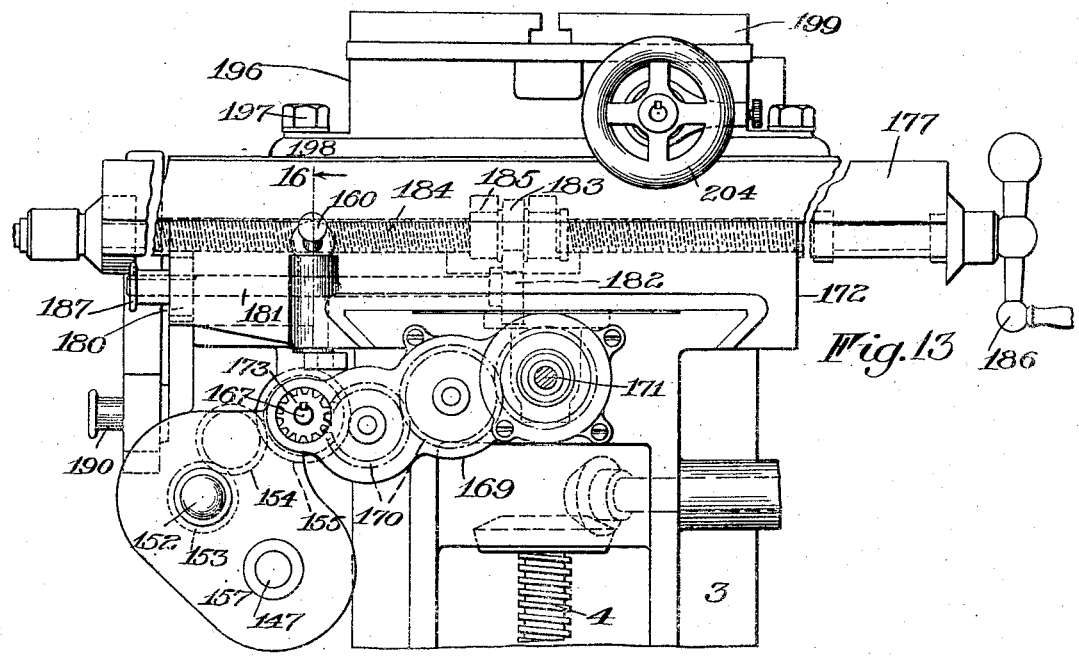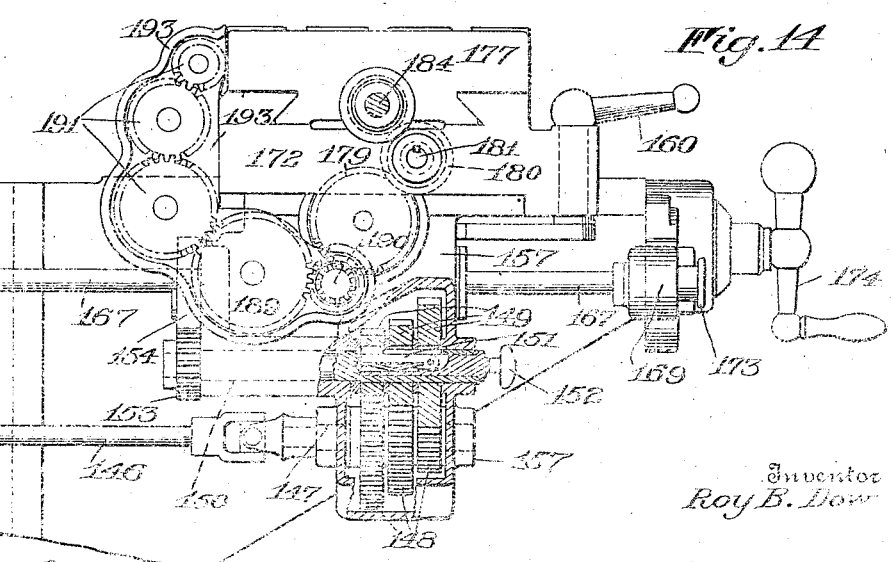

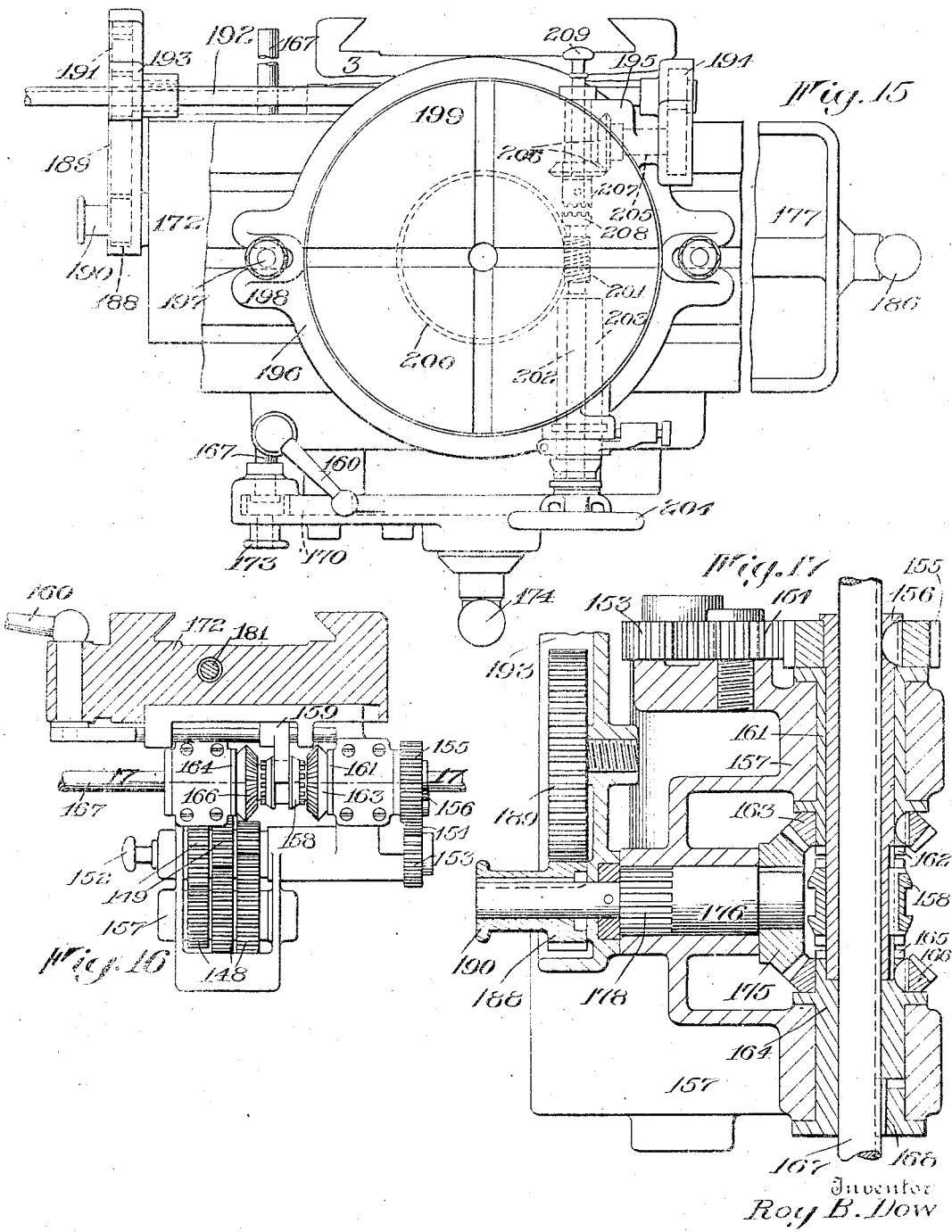

UNITED STATES PATENT OFFICE.

ROY B. DOW, OF ROCHESTER, NEW YORK, ASSIGNOR TO COCHRANE-BLY COMPANY, OF ROCHESTER, NEW YORK, A CORPORATION OF NEW YORK.

COMBINED SHAPING AND MILLING MACHINERY.

1,221,844.        Specification of Letters Patent.      Patented Apr. 10, 1917.

Application filed December 29, 1913. Serial No. 809,199.

*To all whom it may concern:*

Be it known that I, ROY B. DOW, of Rochester, in the county of Monroe and State of New York, have invented certain new and useful Improvements in Combined Shaping and Milling Machinery; and I do hereby declare the following to be a full, clear, and exact description of the same, reference being had to the accompanying drawings, forming a part of this specification, and to the reference-numerals marked thereon.

This invention relates to metal working machines and particularly to a machine for working on forming and other dies, jigs, special tools, etc. A prime object of the invention is to provide a combined machine having full universal features adapting it to perform a great number of operations at one chucking which have heretofore required a number of different machines, thus eliminating the additional expense incident to resetting the work and otherwise contributing to economy in operation. A further object is to introduce various detailed features of improvement contributing to accuracy of the work and general efficiency in use. To these ends in the preferred embodiment shown I provide a circularly adjustable mounting, bearing both milling and shaper heads selectively driven from a common source of power and each of these heads being circularly adjustable individually on said mounting in planes at an angle to that of the mounting adjustment. By this construction I am enabled to set either the shaper ram or milling spindle for action in a horizontal position, or in a vertical position, or at any desired angle, with reference to the work piece on the table underneath. According to a further feature of the invention I provide common feeding connections from the prime drive for actuating the work table in coöperation with either the milling spindle or the shaper ram at will, the change from an intermittent feed when the shaper is being used to a continuous feed when the milling spindle is in operation and vice versa, being quickly and easily performed without any disassemblage of parts. By virtue of this feature in conjunction with the common mounting and drive of the shaper ram and milling spindle, I am enabled to change the set up of the machine from milling to shaping and vice versa very readily and conveniently while the universal mounting of both the milling head and the shaper ram permits the proper setting of the tool for a widely varied range of operations to be made with equal facility; all these various changes and settings being possible without any disassemblage whatever of the machine. My improved machine also exhibits improvements in the operating connections and manner of mounting of the work table and provides improved means for affording positive relief to the shaper tool in its reciprocation. The above and other objects and features of the invention will be better understood from the following detailed description taken in connection with the accompanying drawings and will be thereafter pointed out in the appended claims:

Referring to the drawings:

Figure 1 is a side elevation of a preferred form of machine wherein my invention is embodied;

Fig. 2 is a plan view with a portion at one end broken away and with a cover plate removed to better show the gearing underneath;

Fig. 3 is an enlarged horizontal section on the line 3—3 of Fig. 1;

Fig. 4 is a detail side elevation of the shaper ram, the clapper box being shown in section;

Fig. 4ª is a detail view of the toggle mechanism for operating the clapper block.

Fig. 5 is a side elevation of the milling head, this view showing the opposite side of the mounting from Fig. 4;

Fig. 6 is a sectional view on the line 6—6 of Fig. 5;

Fig. 7 is a front elevation showing the milling and shaper heads with their common mounting, parts being broken away in section;

Fig. 8 is a sectional view on line 8—8 of Fig. 7;

Fig. 9 is a vertical section on line 9—9 of Fig. 2 looking in the direction of the arrows;

Fig. 10 is a vertical section on the line 10—10 of Fig. 2;

Fig. 11 is a side elevation, looking at the back of the machine as seen in Fig. 1, showing the table feed connections;

Fig. 12 is a horizontal section on line 12—12 of Fig. 11;

Fig. 13 is a front view of the work table;

Fig. 14 is a side elevation of the work table and operating connections, looking from the left in Fig. 13, the circular table having been removed;

Fig. 15 is a plan view of the work table;

Fig. 16 is a vertical section on line 16—16 of Fig. 13, and

Fig. 17 is an enlarged horizontal section on the line 17—17 of Fig. 16.

Similar reference numerals throughout the several figures indicate the same parts.

I provide a main frame or support shown as an upright column or pedestal 1, having on its front side vertical slide ways 2 to which is fitted the knee or base support 3 of a work table which is vertically adjusted by a screw shaft 4 through the instrumentality of a hand operated shaft 5 as is usual in shaping and milling machines. At the top of the column 1, I form a circular vertical bearing face 6 on which a mounting block 7, having tool heads adjustable to any angle, is clamped by bolts 8 having heads engaging an annular under-cut 9 of the column framework. As a convenient means for angularly adjusting this cutter head mounting and also to provide a bearing for the central drive shaft I provide a concentric sleeve block 10 having bearing in the framework and held rigid with the mounting 7 as by a key 11, projecting from an inwardly extending flange of the mounting. Block 10 has keyed to its inner end a worm wheel 12 engaged by a worm 13 mounted in the framework and extending out of the framework casing with a squared end 14 for engagement by a wrench, the mounting 7 and the concentric block 10 furnishing bearing for a drive shaft 15 arranged concentric with the axis of adjustment of the mounting 7. The shaft 15 which transmits driving impulse for the shaper ram and for the milling tool is itself driven through a selective pair of a bank of change gears 16 and a stub shaft 17 to which one set of change gears is fixed, by a pinion 18 which meshes with one of the gears, shown as the gear 19, of the change gear set. The set of change gears on shaft 15 are selectively engaged with said shaft to drive it by a slidable key 20, yieldingly supported by a spring 20ª, pivotally carried by a slide block 21 mounted in a hollow end of the shaft and having a lateral extension 22 with a rack 23 extending angularly therefrom and guided by the top of the casing as shown, this rack being engaged by a segment gear 24 on a shaft 25 extending out of the casing where it is equipped with an operating arm 26. The pinion 18 is shown as keyed on a shaft 27 journaled in the fixed bushing 28 on the framework. The outer end of shaft 27 has loosely mounted thereon a prime drive pulley 29 and it has keyed thereon clutch disk 30 adapted to be engaged with the pulley 29 at will by pivoted clutch arm 31 acting to expand clutch shoes on the clutch disk 30 against an embracing flange of pulley 29, the arm 31 being for this purpose engaged by a slide cone 32 actuated by a slide rod 33 fitted in a central bore of the shaft 27 and operable by a swinging arm 34 fixed on a shaft 35 extending without the casing with an operating handle 36. The slide cone 32 in addition to its forward cone face 37, which actuates the clutch, also has a rear cone face 38 engageable with a fixed cone seat to serve as a brake for the shaft 27 and driven parts, when the cone 32 is pressed thereagainst. The shaft 15 has fixed at its inner end a driving pinion 39 in driving engagement with a bevel wheel 40 keyed on a shaft or rotary block 41 journaled crosswise of the mounting 7, said mounting having a laterally extended sleeve 42 to afford an adequate bearing support for said rotary block. The mounting 7 also is provided with opposite lateral bearing faces 43—44 formed upon adjacently mounted spaced flanges connected by a web-like portion extending outwardly and centrally from the flange by which the mounting is secured to the bearing face 6 of the support, and to said bearing faces are clamped the shaper head 45 and the milling head 46 respectively, each of these heads having annular under-cut slots engaged by the heads of the clamp bolts 47 to hold them with a capability of circular adjustment to any angle. The rotary block or shaft 41 constitutes a common drive for both the shaper ram and for the milling tool, having connections to operate the shaper at its one end and the milling tool at the other. At one end of the shaft 41 which extends within the shaper head 45, I provide an enlarged face flange 48 bearing a crank pin 49 for actuating the shaper. This crank pin is adjustable toward and away from the center of the shaft 41 so that its throw may be varied and as a suitable means to this end, I mount said pin directly on a circular cone block 50 eccentrically seated in the face flange 48 and having a shaft 51 extending out through the rotary block 41 with a nut 52 at its end adapted to be engaged by a wrench for drawing up the cone block 50 into engagement with its seat. As a means for definitely adjusting the cone block 50 angularly and thus varying the throw of the crank pin 49, I key to the outer end of shaft 51 a worm wheel 53 engageable by a worm 54 adapted to be engaged by a wrench, these parts being shown as carried in a housing block 55 secured to the outer end of the rotary block 41.

The shaper ram slide designated generally at 56, is slidably guided in under-cut slideways 57 of the shaper head 45 and it is pivotally engaged as seen at 58 with the outer end of a swinging arm 59 pivotally mounted at 60 to a movable fulcrum formed by swinging links 61 pivotally carried at 62, at the rear of the shaper head. The swinging arm 59 has a wide elongated slot 63 extending through the intermediate portion thereof and in this slot is slidably fitted a block 64 which is fitted around the crank pin 49. Thus the shaper ram slide is reciprocated with a stroke variable according to the distance the crank pin 49 is positioned from the axis of shaft 41. Further, the described crank and link movement provides a relatively slow and powerful operative stroke with a quick return, the drive being in a direction so that the crank pin moves in the direction of the arrow in Fig. 4, thus being farther away from the fulcrum point 60 on the working down stroke and nearer said fulcrum on the return or up stroke.

I also provide means whereby the tool is relieved by being positively moved away from the work on the return stroke and then positively moved back to operative position at the beginning of the cutting stroke. For this purpose the tool holder 65 is carried by a clapper box 66 pivoted at 67 to the lower end of the tool slide ram and this clapper box is pivotally engaged at 68 to the lower end of a vertical rod 69 which extends upward to an intermediate point on the tool slide where it has turnbuckle engagement 70 with the lower end of the vertical rod 71. The rod 71 has its lower portion slidably fitted to a guide 72 on the tool slide and its upper end has fixed thereto an enlarged head 73 also guided in the tool slide. The head 73 is formed with a pivot bearing 74 for the end of one link 75 of a toggle device consisting in the links 75, 76 pivoted together, the link 76 having its other end fixed to a shaft 77 journaled in the tool slide. The shaft 77 also has fixed thereto at the side of the slide an operating dog 78 having obliquely extending surfaces 79 at opposite sides of its mounting on shaft 77. These surfaces of dogs 78 are engageable at the ends of the cutterslide strokes by rolls 80 and 81 carried on brackets 82 and 83 both in threaded engagement with a screw rod 84 mounted on the shaper head in parallelism with the tool slide. The two end portions of the rod 84 are oppositely threaded as seen in Fig. 4 so that when it is turned as by a knurled head 85 at its top, it simultaneously spaces the rolls 80 and 81 nearer together or farther apart as may be required while preserving their relative spacing from a central point. The brackets 82 and 83 are shown as guided and held in adjusted position by clamp bolts 82$^a$ having heads engaging an undercut slot in a vertical guide bar 82$^b$ carried by the shaper head. With this construction, as the tool slide 1 nears its upper limit of return movement the upper inclined surface 79 of dog 78 engages the upper roll 80 moving the toggle links 75 and 76 to straighten them, thereby drawing the rods 71 and 69, so that the clapper box is swung up to operative position as seen in Fig. 4, which position the parts maintain during the cutting movement. At the end of the downward cutting movement the lower inclined surface of dog 78 engages the lower roll 81 swinging the toggle links 75 and 76 outward whereby the clapper box is swung downward to relieve the tool on the return stroke. Thus the tool is positively moved to set it in cutting position at the beginning of the cutting stroke and is positively relieved at the beginning of the return stroke, and the operating means, i. e. rolls 80 and 81 which effect this relief movement are easily and quickly positioned as required according to the different lengths of stroke of the shaper ram by turning the knurled head 85.

The milling head 46 has at its front side undercut slideways 86 in which is fitted a bearing and feed slide 87 for the rotary or milling spindle 88. The feed slide 87 is shown as equipped with a usual cone bearing bushing 89 at the lower portion of the milling spindle and with a rack 90 engageable by a gear pinion 91 fixed on a cross shaft 92, and the shaft 92 is actuated for feeding the milling spindle up and down by the worm wheel 93 thereon engaged by a worm 94 on a shaft 95 transversely mounted in a bracket of the milling head and having a hand wheel 96 extending out at the front in convenient position for manipulation to feed the spindle for milling or drilling. I preferably equip the milling slide with a micrometer stop, this being shown as a threaded rod 97 with knurled upper end having a nut 98 with graduated periphery fitted thereto and held between ears 99 projecting from an upper portion of the milling slide. This threaded rod is adapted to engage a stop lug 100 on the milling head framework when the slide has been fed down to a predetermined extent. Power for driving the rotary spindle 88 is transmitted from the rotary block, or shaft 41 by means of a bevel gear 101 fixed at the end thereof in driving engagement with a bevel pinion 102 fixed on a short shaft 103, journaled in a laterally extending bracket of the milling head. The shaft 103 also has fixed thereto a pinion 104 adapted to drive gear 105 slidably keyed on the milling spindle through one or both of the intermediary gears 106—107, these gears being mounted on a bracket 108 fitted to swing about the spindle 88 and arranged so the shaft 88 is driven in one direction, with the gear 106 as the sole intermediate as seen in Fig. 2, or so that the spindle 88 may be driven in the other direction, gear 106 being swung out of engagement with the pinion and the gear 107 into engagement with said pinion as is usual in such reversing gear mechanisms. The swinging bracket 108 is adapted to be locked in either of its adjusted positions for driving the milling spindle in either direction by a spring pressed locking pin 109 adapted to engage spaced apart notches in the head; I also prefer to provide a third notch adapted to hold the swinging bracket 108 in such a position that both intermediates are disconnected so that the milling spindle is not driven. It is to be observed that with the described construction of milling head and shaper ram mounting, it is possible to bring either tool to a vertical, horizontal, or any angular operative position quickly and easily, and by utilizing the circular adjustment of the common mounting 7 on the bearing face 6 in conjunction with the individual adjustment of either tool head on the respective bearing faces 43 and 44, a universal adjustment of both tools is permitted. Further that all these adjustments are possible without disconnecting or in any way disturbing the common drive connection to both tools, or the individual branch drive to either tool. It is to be further observed that the shaper ram 56 and the milling spindle 88 are both disposed at the front of the common mounting 7 with all the controlling elements also easily accessible from the front of the machine so that the operator can most conveniently keep the work under inspection and effect the requisite control of the operating parts. The shaper ram may be rendered inoperative when the milling spindle is being used by setting the crank pin 49 to a zero throw position, i. e. concentric with the shaft 41, and the milling spindle may be likewise rendered inoperative when the shaper ram is being used by moving the reverse gear bracket 108 to gear disconnecting position as described.

Power for effecting the work feeds is transmitted to the work table from the prime drive shaft 27 and through the change gear series 16 in the following manner: A short shaft 110 is journaled in the machine framework, shown as concentric with the shaft 17 and having an end of said shaft extending into and with bearing in the bore thereof as seen at 111. The inner end of this shaft has keyed thereto a gear 112 in mesh with a gear 113 keyed on the shaft 15, thus causing the shaft 110 to be variably driven according to the rate at which the shaft 15, which transmits power to the cutter heads, is driven by the change gears. The shaft 110 has fixed thereon a sprocket wheel 114 operating a sprocket chain 115 which drives sprocket wheel 116 keyed on a shaft 117 constituting a part of the work feed mechanism which is journaled in a bracket 118 at a lower intermediate point at the back of the pedestal. The shaft 117 has keyed thereon a pinion 119 driving a gear 120 journaled on a stud 121, and the gear 120 in turn drives a gear 122 keyed on a sleeve 123 journaled in a bracket support and having an internal slidable key connection with the shaft 124 fitted therein. The shaft 124 has fixed thereon two gears of diverse size 125, 126 adapted to be selectively engaged with spaced apart gears 127, 128 keyed on shaft 129 also journaled in the bracket 118. The shaft 124 has three notches 130 adapted to be selectively engaged by a spring pressed detent 131 carried by the sleeve 123, these notches being spaced so as to hold either of the gears 125 or 126 in engagement with their respective mating gears 127 or 128 or to hold both gears disengaged at will, the shaft 124 being equipped with a hand knob 132 at its end for convenient manipulation. The shaft 129 which transmits motive impulse to the table through suitable flexible shafting is thus given a constant drive as required for milling and like operations at selective speeds as determined by the change gears 125, 126, 127, 128. I also provide means for transmitting an intermittent drive from the shaft 117 to shaft 129 for effecting a step by step feed as required for shaping and other reciprocating tool operations and for this purpose I provide a disk flange 133 keyed to the end of shaft 117 and having clamped thereto a crank plate 134. The connection of this crank plate 134 to the disk 133 is by means of elongated arcuate slots 135 in the crank plate through which are passed clamp bolts 136 fitting into the disk 133, thus permitting a substantial range of angular adjustment of the crank plate relative to disk 133. The purpose of this is to permit timing of the intermittent work feed by adjustment of the angular position of a crank pin 137 and the work feeding impulses may thus be timed properly with reference to the movements of the shaper ram throughout the range of adjustment of said ram, it being understood that without this provision the relative timing might be disturbed as the shaper ram is adjusted angularly owing to the fact that its driving elements in different adjustments of the ram occupy different positions relative thereto. The crank pin 137 is adjustable in an undercut radial slot 138 toward and away from shaft 117 to give it a greater or less throw as required and it has connected thereto one end of a pitman rod 139, the other end of which is pivotally engaged as at 140 with a shroud or sleeve 141 journaled concentric with the shaft 129, this sleeve 141 having at one side a projection 142 furnishing a mounting for a spring pressed pawl 143 which is reversibly mounted therein.

The pawl 143 is adapted to operatively engage a ratchet wheel 144 fixed to the shaft 129 and within the shroud 141; or the pawl may be turned half way around to an inoperative position as seen in Fig. 11 where it is preferably held lifted out of engagement with the ratchet teeth by a suitable detent element 145 on its projecting head. Thus an intermittent work feed may be transmitted to the table at a rate variable as required and in definite timed relation to the tool movement, or such intermittent feed may be instantly rendered inoperative at will, by moving the pawl 143 to inoperative position. The feed mechanism thus constructed is so organized that it is adapted to transmit either continuous or intermittent feeds at will and at rates variable as required with reference to the rate of tool movement.

From the shaft 129 power impulse for operating the work table is transmitted through a suitable flexible shafting 146 shown as of the telescopic-shaft, universal-joint type, to a short shaft 147 journaled in a bracket mounting and gear casing 157 carried by and depending from the work table saddle 172. The shaft 147 has fixed thereon one series 148 of a bank of change gears, the other series 149 of which are loosely mounted on a shaft 150 also mounted in the bracket casing 157 to be selectively engaged therewith by a slidable key element 151 having a projecting operating head 152. The shaft 152 has fixed at its inner end a gear pinion 153 in driving engagement with an intermediate idler 154 which is in mesh with a gear 155. The gear 155 has fixed keyed engagement with a long sleeve 156 journaled in the bracket casing 157. The inner end portion of this sleeve has slidably keyed thereon a double faced clutch member 158 operable by a usual shipper device 159 from an operating handle 160. The sleeve 156 has fitted therearound and held from longitudinal movement in the bracket casing 157 another sleeve 161. The sleeve 161 has its inner end formed with clutch teeth 162 for engagement with clutch teeth at one end of the clutch collar 158 and this sleeve also has keyed thereto a beveled pinion 163. At the inner end of the sleeve 156 and coaxial therewith is still another sleeve 164 journaled and held from endwise movement in the mounting bracket 157 and having clutch teeth 165 at its inner end engageable by the clutch teeth at the other end of the clutch collar 158. The sleeve 164 also has fixed thereto a beveled pinion 166 similar in size to the pinion 163 and opposite thereto. From the transmission elements just described power is imparted (a) for moving the table saddle in and out from the column, (b) for moving the table in a straight line transversely of the column, and (c) for revolving a circular top table. For transmitting power to move the table in and out I fit a shaft 167 within the sleeves 156 and 164 with a capacity for endwise movement in both said sleeves but in slidably keyed relation to the sleeve 164 as by means of the key 168. The shaft 167 at its inner end is held from endwise movement and is operatively engaged with a train of gears in a gear casing 169 fixed to the outer extremity of the knee or table base. This gear train designated generally at 170, transmits the drive from shaft 167 to the screw 171, which engages a nut depending from the work table saddle 172 to move the same in and out from the pedestal. One of the train of gears 170 is adapted to be moved endwise to disengage the connection, the one on shaft 167 being shown as arranged for this purpose with a projecting operating knob 173, and when so disengaged the screw 171 can be turned by hand by means of a handle 174. It is to be observed that the drive just described may be imparted from the clutch collar 158 through the clutch sleeve 165 on the sleeve 164 direct to the shaft 167 for imparting movement in one direction. To reverse the direction of the drive of the shaft 167 and hence move the work table saddle in the other direction the drive is from clutch element 158 to clutch teeth 152 on outer sleeve 161, thence through bevel wheel 163 to an intermediate bevel gear 175 to the bevel wheel 166 keyed on the sleeve 164, and thence to the shaft 167 as before. The bevel gear 175 which is keyed to the short shaft 176 journaled in the bracket support also serves to transmit driving impulse in either direction for moving the table laterally and also for revolving the circular top table. As a means for effecting movement of the transversely movable table 177 I provide the shaft 176 with a pinion 178 in driving engagement with a gear 179 which drives a pinion 180 slidably keyed at the outer end of a shaft 181 journaled in the saddle, this shaft having fixed at its inner end a pinion 182 in driving engagement with gear teeth carried by a nut 183 fitted on the feed shaft 184, the nut 183 being held from endwise movement in its mounting 185 on the saddle 172, and the feed shaft 184 being mounted at its ends in the table 177. The feed shaft 184 may be held from rotation in any suitable manner when the power feed just described is in operation and it may also be rotated by hand through a handle 186. The pinion 180 is adapted to be moved endwise on the shaft 181 so as to disconnect the driving train by means of a projecting spool 187 carried thereby.

Driving impulse for rotating the circular top table by power when desired is transmitted from the shaft 176 by means of a pinion 188 slidably keyed thereon and engageable with a gear wheel 189, this pinion having formed therewith a projecting spool flange 190 whereby it may be pulled endwise to disengage it from driving engagement with gear 189. The gear 189 constitutes the driving member of a gear train 191 the driven member of which is slidably keyed on a shaft 192. The gear train 189—191 has its several gears mounted on pivot studs carried by a bracket 193 fixed to the saddle 172 while the shaft 192 has fixed at its end one member of a gear train 194, this gear train being carried by a bracket 195 formed with the circular table base 196, the shaft 192 being held to move endwise with this gear train and bracket. The circular table base 196 is adapted to be removably fixed to the top of table 177 as by means of clamp bolts 197 engaged with projecting ears 198 of said base. Circular table 199 is rotatably fitted to the base 196 and it has provision for rotation by means of a worm wheel 200 in fixed concentric relation thereto and underneath, this worm wheel being engaged by a worm 201 on a shaft 202 mounted in an eccentric bearing sleeve 203 and projecting outwardly with a hand wheel 204 fixed thereto for manual operation of the work table. The eccentric sleeve 203 may be turned so as to move the worm 201 out of engagement with the worm wheel when desired so that the work table may be freely turned directly. The power connection from the gear train 194 for turning the table is transmitted through a short shaft 205 journaled in the bracket 195, and bevel gear 206 to an endwise movable clutch block 207 having clutch teeth at its end adapted to engage corresponding teeth formed on a clutch head 208 extending from the end of the worm 201. The clutch block 207 may be moved endwise by a hand rod 209 to engage or disengage the clutch elements at will and thus throw in or out the power drive. It will be understood that all this series of operative parts is mounted and carried by brackets on the table base 196 so that these parts can be removed intact along with the shaft 192 when it is desired to remove the circular table, the shaft 192 being drawn out from the gear train 191 leaving this undisturbed. Referring to Fig. 17 it will be understood that driving movement may be imparted to operate either the transverse table 177 or the circular table 199 in either direction by manipulation of the clutch sleeve 158. When this is moved to engage the clutch teeth 162, drive is imparted from the sleeve 156 to the gear 163 and through this to the gear 175 and thus to the feed train, the gear 166 then turning idly while when the clutch sleeve 158 is engaged with the clutch teeth 165 and the drive is from the gear 166 to the gear 175 the gear 163 turns idly. Thus this combination of parts in connection with the shaft 167 disposed as described permits a single shifter device to control the movements in each direction of the saddle, the transversely movable table and the circular table.

My improved machine with its universal features, and the arrangement of the shaper ram and the milling head each universally adjustable, while having a permanently assembled common drive selectively and variably connectible with the respective tools makes it possible to machine economically, with regular equipment and standard tools, a large amount of work which has usually required operations on several machines, with special tools and fixtures, as for instance in the production of internal and external cams, gears, and ratchets; likewise in broaching blind holes and keyways, and other like work usually difficult to perform except with special equipment. The head of the column or pedestal is preferably formed as an oil tight box containing the driving and speed change gears there being a web 210 constituting the bottom of this oil box housing, and the top of the column being formed with a removable cover 211 permitting free access to the gears when required.

I claim as my invention:

1. A machine of the kind described, comprising a support, a work table movably mounted thereon, a reciprocating tool head and a rotary tool head mounted on said support with provision for adjustments to permit either head to be brought into operative relation to the work table at will, a common drive mechanism for the tools in both said heads, and an operative connection from said drive mechanism for moving said table, said connection having an intermediate portion arranged to transmit an intermittent feed for shaping, or a constant feed for milling, at will.

2. A machine of the kind described comprising an upright column support, a mounting secured at the front thereof for angular adjustment in a given plane, said mounting having a central web-like portion supporting adjacent flanges having bearing surfaces to receive opposite swivel heads for angular adjustment in planes at an angle to the plane of mounting adjustment, a shaper head and a milling head adjustably fixed to the respective bearing surfaces, said shaper head having a shaper ram engaged in slide ways at the front thereof, and said milling head having a milling slide bearing a milling spindle secured in slide ways at the front thereof, and a common driving means arranged to operate tools in either of said heads in any position of angular adjustment thereof.

3. A machine of the kind described comprising a column support and a mounting block bearing cutter head mechanism secured thereto for angular adjustment in a given plane, said mounting block having a sleeve member concentric with its axis of adjustment extending back into the column support, a worm wheel fixed to said sleeve member and a worm having an outwardly projecting operating shaft engaged with said worm wheel for effecting adjustment of said mounting block, and a power drive shaft extended through said sleeve and mounting block concentric with the axis of adjustment thereof.

4. A machine of the kind described comprising an upstanding column support, a mounting bearing tool head mechanism secured at the upper portion thereof with provision for angular adjustment in a given plane, and driving mechanism including change gear devices mounted and housed in the upper portion of the columns for operating said tool heads, the upper portion of the column support being formed as an oil tight box in which the driving and change gears are held.

5. A machine of the kind described, comprising a support, shaping and milling heads mounted thereon, a common drive having connections for operating each of said heads, a work table and a connection from said common drive to said work table, said connection having a pawl and ratchet device incorporated therewith and selectively operable to convert rotary driving motion into intermittent feed movement of the table for shaping said connection to the work table also including a constant drive train for milling feeds.

6. A machine of the kind described comprising a reciprocating tool head and a rotary tool head having a common mounting support and a common driving mechanism, engageable to operate a tool in either head, a movable work table and a connection from said common driving mechanism to the movable work table, said connection embracing a train of gears for transmitting continuous feed to the table with provision to be disconnected at will, and also including a pawl and ratchet device for transmitting intermittent feed to the movable work table when said continuous feed gear train is disconnected.

7. A machine of the kind described, comprising a support, a mounting secured thereto for angular adjustment in a given plane, said mounting having adjacently positioned spaced flanges provided with bearing faces adapted to receive swiveling tool carrying heads, means engaging the inner faces of each of the flanges adapted to support the swiveling heads upon the flanges, and means for operating the tools carried by the swiveling heads.

8. A machine of the kind described, comprising a support, a mounting secured thereto for angular adjustment in a given plane, said mounting having opposite bearing faces each adapted to receive a tool carrying swiveled head, a drive connection comprising a shaft rotatable in the mounting, and a second shaft geared thereto extending transversely of the mounting within said heads, an intermediate shaft mounted upon one of said heads and operatively connected with the second mentioned shaft, a tool holding spindle mounted upon the head carrying the intermediate shaft, means operatively connecting said spindle and intermediate shaft, and a tool holding member mounted upon the other of said swiveled heads and operatively connected with the second mentioned drive shaft.

9. A machine of the kind described comprising a support, a mounting secured thereto, a drive connection comprising one element rotatable in the mounting and another element operatively connected therewith, a tool holding head upon one side of said mounting and a second tool holding head upon the other side of the mounting, means upon the first mentioned head connected with the second mentioned element for operating a tool carried by the first mentioned head, means carried by the second mentioned head connected with the second mentioned element for operating a tool carried by the second mentioned head, and means mounted upon the second mentioned element connected with said last mentioned means for shifting the same to provide relatively different movements of said last mentioned tool.

ROY B. DOW.

Witnesses:
G. WILLARD RICH,
RUSSELL B. GRIFFITH.